US007356560B2

(12) United States Patent
Calinov et al.

(10) Patent No.: US 7,356,560 B2
(45) Date of Patent: Apr. 8, 2008

(54) PRESENTING CUSTOMIZED CONSUMER REGISTRATION INFORMATION ON BEHALF OF A THIRD PARTY

(75) Inventors: Iulian D. Calinov, Redmond, WA (US); Danpo Zhang, Issaquah, WA (US); Li-Fen Wu, Redmond, WA (US); Hai Zhuang, Seattle, WA (US); Gilbert Martin McQuillan, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 842 days.

(21) Appl. No.: 10/157,100

(22) Filed: May 28, 2002

(65) Prior Publication Data

US 2003/0225871 A1    Dec. 4, 2003

(51) Int. Cl.
*G06F 15/16* (2006.01)

(52) U.S. Cl. .............. 709/203; 709/202; 709/217; 709/223; 709/228; 709/238; 707/1; 707/9; 715/762; 715/763; 715/764; 715/749

(58) Field of Classification Search .............. 709/217, 709/223, 202–203, 228, 238; 707/1, 9; 715/762–764, 715/505–507, 749; 713/202, 184
See application file for complete search history.

(56) References Cited

U.S. PATENT DOCUMENTS

| | | | | |
|---|---|---|---|---|
| 5,944,824 A | * | 8/1999 | He | 726/6 |
| 6,496,855 B1 | * | 12/2002 | Hunt et al. | 709/217 |
| 6,711,682 B1 | * | 3/2004 | Capps | 713/184 |
| 6,775,828 B2 | * | 8/2004 | Feinleib et al. | 717/173 |
| 6,823,327 B1 | * | 11/2004 | Klug et al. | 707/1 |

* cited by examiner

*Primary Examiner*—Saleh Najjar
*Assistant Examiner*—Shawki S Ismail
(74) *Attorney, Agent, or Firm*—Lee & Hayes, PLLC

(57) ABSTRACT

A general provider of a core registration service provides registration services to a special service provider. In one implementation, a first party presents a user registration form to a second party on behalf of a third party The first party receives registration provisioning data from the third party, which is used by the first party to generate a custom registration form. Responsive to receiving a request from a second party to register for a specialized service provided by a third party, the first party communicates the custom registration form to second party.

24 Claims, 3 Drawing Sheets

PRESENTING CUSTOMIZED CONSUMER REGISTRATION INFORMATION ON BEHALF OF A THIRD PARTY

TECHNICAL FIELD

The following description relates to registering for a network service. More particularly, the disclosed subject matter pertains to generating and presenting customized user registration information to a user on behalf of a third party service provider.

BACKGROUND

The Internet and the World Wide Web (WWW) have had a dramatic effect on electronic commerce and network services such as Internet access, client/server application services, and traditional services such as e-mail. Network service providers try to make using the Web and purchasing goods and services online easier, faster, and more secure for customers. To accomplish this, a typical network service transaction may involve a three-way relationship between a consumer, a specialized service provider, and a general service provider.

The general service provider may provide a set of standard or core services to any number of specialized service providers. These core services are directed not only to simplifying consumer access to Web sites associated with the specialized service providers, but are also directed to providing authentication and security to both the consumers and specialized service providers. For instance, by letting consumers register a single time at the general service provider, a consumer can create a single user name and password that works across all specialized service provider sites that are signed up with the general service provider. This eliminates the need for consumers to separately register with specialized service providers and remember multiple sign-in names and passwords.

Additionally, allowing a consumer to register once at the general service provider to obtain any number of specialized services presents a specialized provider with a consistent way to refer to individuals, groups, and companies online; a way to notify them of important events; and to obtain data to orchestrate Web services, and devices on behalf of consumers, with full consumer consent. However, even though conventional consumer registration techniques have these and other benefits, they are also substantially limited for a number of reasons.

For instance, the generalized provider of core user registration services typically presents a registration page to a user that includes a number of user interface (UI) elements to collect specific information from the user or consumer. The registration page typically enforces collection of a fixed set of data that cannot be modified by participating specialized service providers. This means that a specialized service provider typically has no control over the arrangement, formatting, or content of the registration page UI elements that are used to collect consumer specific data. Thus, conventional consumer registration techniques on behalf specialized service providers are not particularly flexible in their integration with the specific or dedicated services of the specialized providers.

These and other limitations of conventional consumer registration techniques provided by a generalized provider on behalf of specialized providers are addressed by the following described arrangements and procedures.

SUMMARY

A general provider of a core registration service provides registration services to a special service provider. In one implementation, a first party presents a user registration form to a second party on behalf of a third party The first party receives registration provisioning data from the third party, which is used by the first party to generate a custom registration form. Responsive to receiving a request from a second party to register for a specialized service provided by a third party, the first party communicates the custom registration form to second party.

BRIEF DESCRIPTION OF THE DRAWINGS

The same numbers are used throughout the drawings to reference like features and components.

DETAILED DESCRIPTION

The following description sets forth exemplary subject matter to generate and present customized consumer registration information to a user on behalf of a third party specialized service provider. The subject matter is described with specificity to meet statutory requirements. However, the description itself is not intended to limit the scope of this patent. Rather, the inventors have contemplated that the claimed subject matter might also be embodied in other ways, to include different elements or combinations of elements similar to the ones described in this document, in conjunction with other present or future technologies.

Overview

Traditionally, a participating site, or third party service provider that has registered with a generalized service provider for core user registration services has had little or no control over the layout of the registration page. That is, conventional systems and techniques do not allow the third party service provider to exercise any control over the arrangement or formatting of the UI elements presented by the general service provider to collect user specific information or data.

For instance, if a third party was provided any control at all during the presentation of a registration page by such a core services registration arrangement, the third party was typically only allowed to present co-branding information on the outer portions of the registration page; and such presentation was generally limited to using the general service provider's particular, or proprietary co-branding presentation implementation. Thus, third party service providers that leveraged core registration services of the general service provider generally had no control over the fixed type and amount of data collected during consumer registration for their dedicated or specialized services; the specific services for which the user is registering to access.

In contrast to such conventional consumer registration techniques, the following described custom registration systems and techniques provide a core registration service that gives specialized providers substantial control over data collection and presentation during customer registration procedures. Specifically, the general service provider generates and manages customized registration forms on behalf of specialized service providers. The general service provider allows the specialized providers to particularly specify the content and arrangement of information that is going to be presented and/or required to/of a consumer during the registration process.

An Exemplary System

Figure 1:
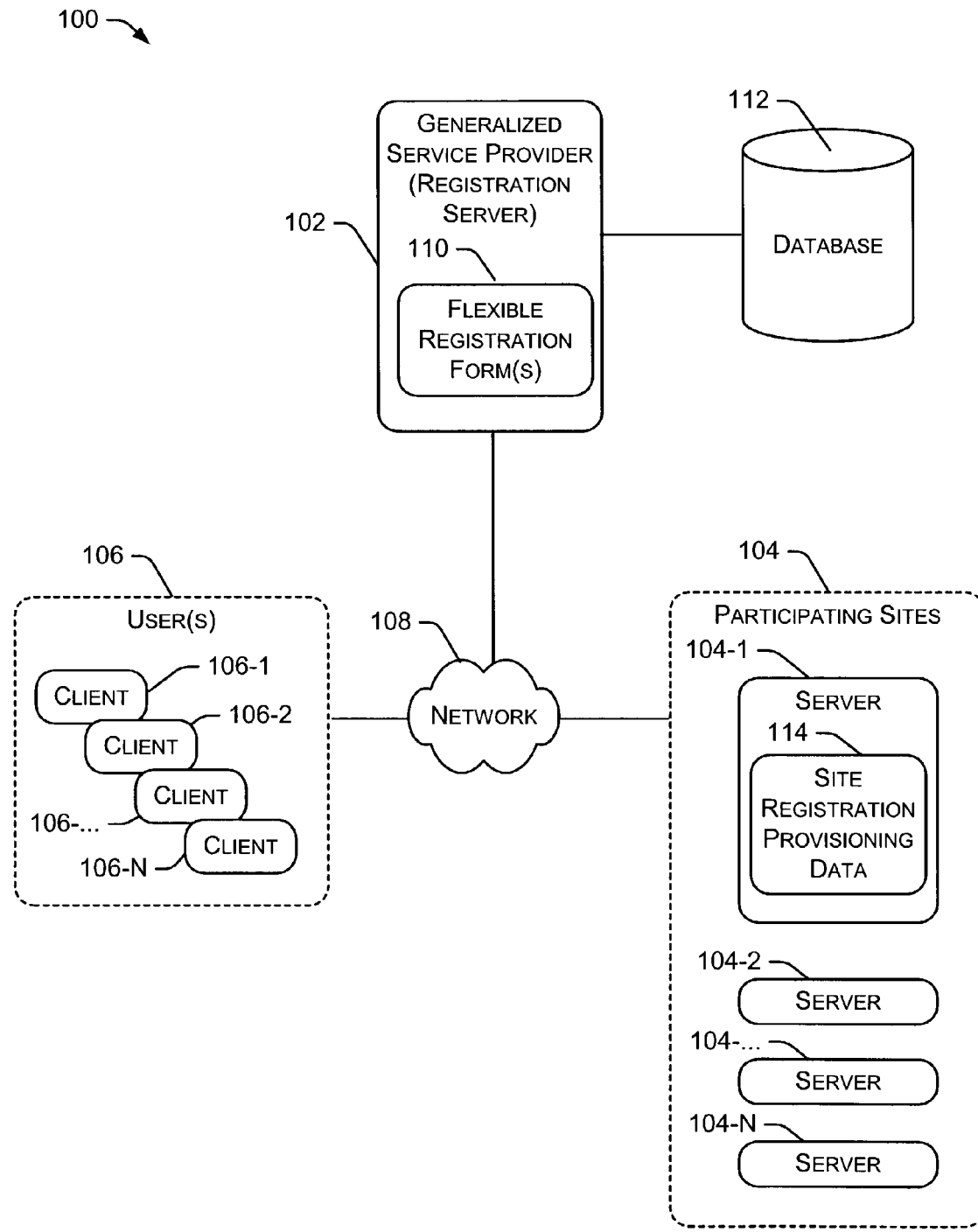
FIG. 1 shows an exemplary system to generate and present customized consumer registration information to a user on behalf of a third party.

FIG. 1 shows an exemplary system 100 to generate and present customized consumer registration information to a user on behalf of a third party. A registration server 102 of a generalized service provider is coupled across network 108 to one or more participating sites, or specialized service providers 104 and one or more users 106. The network 108 represents a communication path such as a parallel connection, a packet switched network (e.g., an organizational intranet network), the Internet, and/or other communication configurations that provide electronic exchange of information between the registration server 102, the participating sites 104, and the users 106 using an appropriate protocol (e.g., TCP/IP, UDP, SOAP, etc.).

The registration server 102 provides a centralized authentication service that offers a single sign-in and core profile services such as flexible, customizable user registration for members sites 104. Information about every participating site 104 that utilizes the flexible registration form 110 aspect of the registration server 102 is stored in a database 112 (e.g., a relational database). Participating sites 104 develop registration provisioning information 114, which includes site-specific settings used by the registration server 102 to dynamically create one or more customized registration pages 110 for a service corresponding to that particular site 104.

A particular participating site 106 can provide provisioning data 114 for the registration server 102 to implement any number or versions of registration pages 110. For instance, a particular site 106 may choose to have the registration server 102 present various registration page 110 versions to substantially address specific user preferences (e.g., language, audio, etc.) and/or particular computing device (e.g., general computing platforms, handheld computing devices, mobile phones, etc.) presentation capabilities. Site-specific registration provisioning information 114 is written in a markup language such as the Extensible Markup Language (XML), which includes customized tags that enable definition, transmission, validation, and interpretation of data between applications.

Exemplary registration provisioning data 114 includes, for example:
  a Namespace Owner (NSO) for the name space in which new user registration is to be performed by the registration server 102;
  information corresponding to the arrangement and presentation of various elements of the custom registration form 110 that will be presented to a registering user to collect specific data from the user;
  a style or device field to indicate when various elements of the custom registration form 110 should be rendered to a particular device based on device presentation capabilities;
  localization information for the custom elements;
  co-branding and style sheet information;
  instructional text and/or site-specific links;
  and so on.

These and other aspects of site-specific registration provisioning data 114 are described in greater detail below and reference to FIG. 2.

An Exemplary Dataflow through the System 100

An exemplary dataflow through the system 100 to utilize an authentication service provided by the registration server 102 is now described. A client 106 issues a first request (e.g., a hypertext transfer protocol (HTTP) GET request), which is directed to a particular specialized provider server 104, for a protected resource/service that is provided by the specialized provider 104. This first request has not been authenticated (e.g., does not contain a valid ticket (cookie)), so the particular server 104 redirects the requesting client 106 to the authentication service provided by the registration server 102; the particular server 104 further passing encrypted parameters to the requesting client 106, which correspond to the original client 104 request on a query string.

Responsive to receiving the redirect from the specialized provider 104, the client 106 follows the redirect and issues the request to the registration server 102 with the query string that was supplied by the specialized provider 104. The registration server 102 presents the requesting client 106 with a flexible registration form 110 by rendering Hypertext Markup Language (HTML) instructions and data to the requesting client 106. The rendered instructions and data 110 have been customized with respect to its particular layout and/or content on behalf of the particular specialized provider 104 from which the user 106 has requested the protected resource/service.

The requesting client 106 fills out the flexible registration form 110 and performs a post (e.g., an HTTP POST) back to the registration server 102 (e.g., using Secure Sockets Layer (SSL)). The Post includes user 106 supplied information and data. The registration server 102 authenticates this user supplied information and data to authenticate the user of the client 106. Upon such authentication, the registration server 102 redirects the client 106 back to the original Uniform Resource Identifier (URI) of the specialized service provider 104 from which the user 106 has requested the protected resource/service. (A URI is a generic term for all types of names and addresses that refer to objects on the WWW. A Universal Resource Locator (URL) is one kind of URI.) This redirection of the client 106 by the registration server 102 includes the registration server 102 determined authentication information of the user (e.g., a ticket encrypted on a query string), which is passed with the redirect to the requesting client 106.

Responsive to being redirected, the requesting client 106 follows the redirect and again requests the original protected resource/service from the specialized provider 104; this request indicating that the user has been authenticated by the registration server 102 (e.g., an authenticated ticket being encrypted on a query string).

Additional aspects of generating and presenting a customized registration form to a user on behalf of a third party are described in greater detail below in reference to FIGS. 2 and 3.

An Exemplary Registration Server 102

Figure 2:
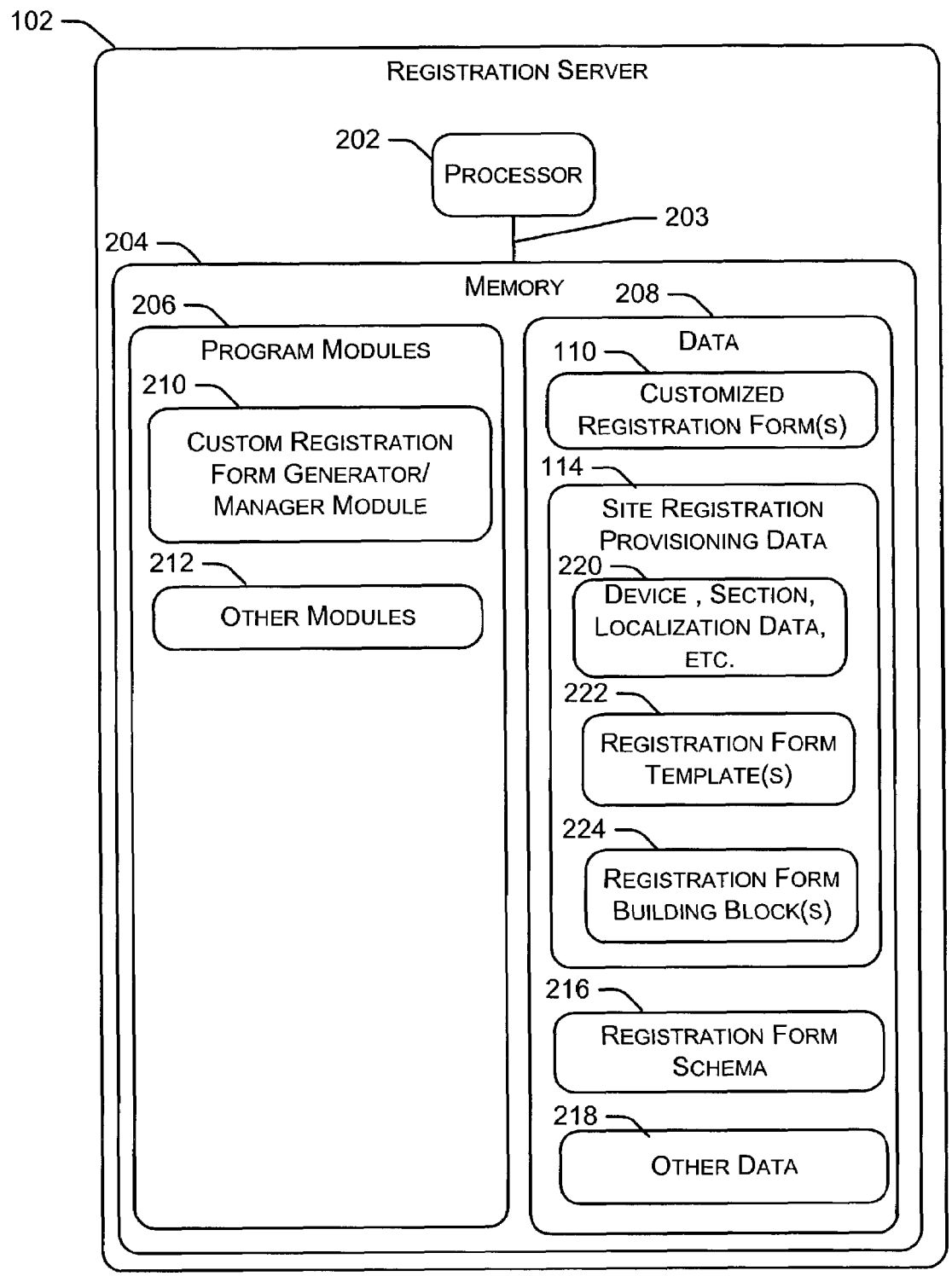
FIG. 2 shows aspects of an exemplary registration server to generate and present customized consumer registration information to a user on behalf of a third party.

FIG. 2 shows further aspects of an exemplary registration server 102 of FIG. 1 to generate and present a customized registration form 110 to a user 106 on behalf of a third party 104. Specifically, the registration server 102 includes a processor 202 coupled across a bus 203 to a system memory 204. The bus 203 represents one or more of any of several types of bus structures, including a memory bus or memory controller, a peripheral bus, an accelerated graphics port, and a processor or local bus using any of a variety of bus architectures. Such bus 203 architectures include, for example, an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus, which is also known as Mezzanine bus.

The system memory 204 includes a variety of computer-readable media. Such media may be any available media that is accessible by the processor 202, and it includes volatile media (e.g., random access memory (RAM)), non-volatile media (e.g., read only memory (ROM)), removable and non-removable media, and the like. RAM typically contains at least portions of data 208 and/or program modules 204 that are immediately accessible to and/or presently be operated on by processor 202. A basic input/output system (BIOS), containing the basic routines that help to transfer information between elements within computer 102, such as during start-up, is stored in ROM.

The processor 202 is configured to fetch and execute computer program instructions from applications or program modules 206 portion of memory 204. Program modules 204 may be described in the general context of computer-executable instructions being executed by a computer. Generally, program modules 204 include routines, programs, objects, components, data structures, etc., that perform particular tasks or implement particular abstract data types.

An exemplary system and procedure to obtain customizable registration information from users of specialized services on behalf of specialized service providers is practiced in a distributed computing environment 100 of FIG. 1, where tasks are performed by processing devices that are linked through a communications network. Accordingly, program modules 204 may be located in both local and remote computer storage media including memory storage devices that are coupled to the registration server 102.

The program modules 204 of source server 200 include, for example, the custom registration form generator/manager module 210, and other applications 212 (e.g., an operating system, administrative console applications, a Web browser, and so on). The processor is also configured to fetch data from the data 208 portion of memory 204 while executing the program modules 204.

The data 208 includes, for example, one or more customized, or flexible registration forms 110 (i.e., the registration form 110 of FIG. 1), participating site registration provisioning data 114 (i.e., the site registration data 114 of FIG. 1), a registration form schema 216, and other data 218. The site registration data 114 further includes one or more registration form templates 220, and one or more registration form building blocks 222. Exemplary aspects of the modules 206 and data 208 are now described.

The custom registration form generator/manager module (CRGM) 210 receives the site registration data 114 from a particular specialized provider server 104 of FIG. 1. The site registration data 114 is represented as an XML file 114. The XML file 114 includes a number of device, section, and/or localization data 220, a number of templates 222, and a number of building blocks 222. Each of these exemplary aspects is now described in greater detail with respect to the generation of the customized registration form 110.

Exemplary Device Section and Localization Data 220

Each device or "style" element 220 indicates the appearance (e.g., a control's color, font, and so on) of registration form 110 elements. A style 220 also provides for versioning of customized registration forms 110. For instance, by specifying various styles 220, a service provider 104 can create different registration 110 flows or versions for various types of customers, devices, and operating platforms.

A particular participating server 104 can dynamically control which style 220 of the registration page 110 is displayed or rendered to a particular client 106 by passing a query string element to the registration server 102. (Exemplary aspects of a procedure to communicate information (e.g., the query string, and so on) to the registration server 102 are described above in reference to the exemplary operation of the system 100 of FIG. 1, and are further described below in reference to procedure to 300 of FIG. 3).

Each section 220 of the provisioning data 114 is a container for particular UI elements (e.g., controls, bitmaps, text, etc.) and/or behaviors (e.g., as identified in one or more building blocks 224 as discussed in greater detail below). Such elements and/or behavior corresponding to a section 220 are particularly identified in the XML file 114. Each section or container corresponds to a particular style 220, as described above.

Localization data 220 includes service provider 104 supplied and maintained localization strings (e.g., specific language, text and/or audio attributes, and so on). Such localization data 220 are used to obtain and/or convey service provider 104 specific information/data in a specified or default presentation format. Localization data 220 are communicated by the registration server 102 to the client 106 for subsequent presentation to a user by the client 106 (e.g., displayed on a display device, audio, etc.) as at least a portion of a custom registration page 110.

Exemplary Templates 220

A template 220 is a set of HTML elements that identify the layout for a particular portion (i.e., see section 220) of a control (e.g., input elements (a text box, check box, submit button, and so on), list boxes, tables, images, etc.). Thus, a template 220 defines the content of a section of a control, for example, the contents of a row in a list control. Thus, a template 220 described section 220 may correspond to a rectangular portion of a registration page 110. For instance, consider the following template description of TABLE 1.

TABLE 1

EXEMPLARY CODE TO PROVIDE LAYOUT OF A CUSTOMIZED REGISTRATION PAGE

```
<html>
##Section 1##
<table>
    <tr>
        <td>##Section2## ##Section3## ##Section4##</td>
        <td>##Section5##</td>
        <td>##Section6## ##Section7##</td>
    </tr>
</table>
</html>
```

The "##SectionX##" syntax of TABLE 1 identifies a particular section of the exemplary XML file 114. There can be any number of sections and particular page layouts that correspond to a particular site registration file 114. E.g., each section may correspond to a particular page of the custom registration form 110. Templates 220 also allow for specified control over what sections of the XML file 114 will be hidden or displayed in the rendered custom registration page 110.

For instance, the following exemplary code of TABLE 2 provides a condition specifying when a particular section of the XML file 114 will be hidden or displayed in a custom registration page 110 which is rendered to a client 106.

TABLE 2

EXEMPLARY CODE TO CONDITIONALLY DISPLAY A SECTION OF A CUSTOMIZED REGISTRATION PAGE

```
{{if DisplayPage(1)}}
    ##Section1##
{{endif}}
```

Templates 220 are created as declarations in the XML file 114. There are a number of different ways to generate such declarations. For instance, a template 220 can be generated through typed HTML, dragging controls from a Web forms designer directly into a template that is being generated, and so on.

Templates 220 may be generalized in that they may benefit from more specific functionality than that solely provided by a description of elements and controls that describe layout for a control. In light of this, the registration provisioning data 114 that is communicated to the registration server 102 by a particular specialized provider 104 includes any number (zero (0) or more) of building blocks 222 to enhance functionality of the custom registration form 110 templates 220.

Exemplary Building Blocks 222

A building block 222 is UI code that obtains input parameters from information (e.g., the device, section, and/or localization data 220) in the site registration data file 114. TABLE 3 provides for example of a building block.

TABLE 3

EXAMPLE OF A BUILDING BLOCK

```
<table cellpadding="0" cellspacing="0" border="0">
    <tr>
        <td rowspan="3">{{WriteTrans(~~TablePadWidth~~#1)}}</td>
        <td>{{WriteTrans(1#1)}}</td>
        <td rowspan="3">{{WriteTrans(~~TablePadWidth~~#1)}}</td>
    </tr>
    <tr>
    <td class="PPDynamicTxt">
    <ul style="margin-bottom:0px;margin-top:0px;">
    <li>~~DynamicHandler1~~~~DynamicHandler2~~~~
    DynamicHandler3~
~~</li>
    <li>~~DynamicHandler4~~~~DynamicHandler~~~~
    DynamicHandler6~
~~</li>
    </ul>
    </td>
    </tr>
</table>
```

The exemplary building block 222 of TABLE 3 renders two items formatted with bullet points into a custom registration page 110. The areas of TABLE 3 in bold font represent parameters that were passed in from the calling context (i.e., the specific UI context of the client such as screen size, language used, etc.). Syntax used by computing device such as a server to access such specified parameters can be represented in any one of the number of various manners. However, parameter syntax in this example of TABLE 3 is represented as "~~<paramName>~~". It can be appreciated that this building block 222 is only a simplified example, and building blocks 222 can be designed with any level of complexity; each particular building blocks 222 respective level of complexity being a function of the specific application of the particular building block 222.

Preprocessing of the Site Registration Data

The CRGM module 210 preprocesses, or aggregates these described portions 220 through 224 of the XML file 114 to describe the various aspects (e.g., look and feel or page layout, localization strings, data input fields, etc.) of the custom registration page 110. These various aspects can be described in the number of ways including, for example, using hypertext markup language (HTML), wireless markup language (WML), and so on.

To preprocess site registration data 114, the CRGM module 210 validates the contents and data relationships of the site registration data 114 against valid objects, attributes, types, and data relationships, which are described in the registration form schema 216.

The schema 216 provides for passing essentially unnamed (i.e., not descriptively named) building block parameters into a building block 224 through the use of one or more dynamic handlers, each of which are described in the schema 216. (Building block parameters are described above in reference to TABLE 3). Such dynamic handlers provides for a substantially flexible schema 216 against which to validate the site registration data 114.

Subsequent to validating the contents of the site registration data 220 from a particular partner 104, the CRGM module 210 generates and stores one or more corresponding customized registration forms 110 to render (e.g., as HTML content) and adjust to particular client 106 presentation (e.g., Web browser) capabilities.

An Exemplary Procedure

Figure 3:
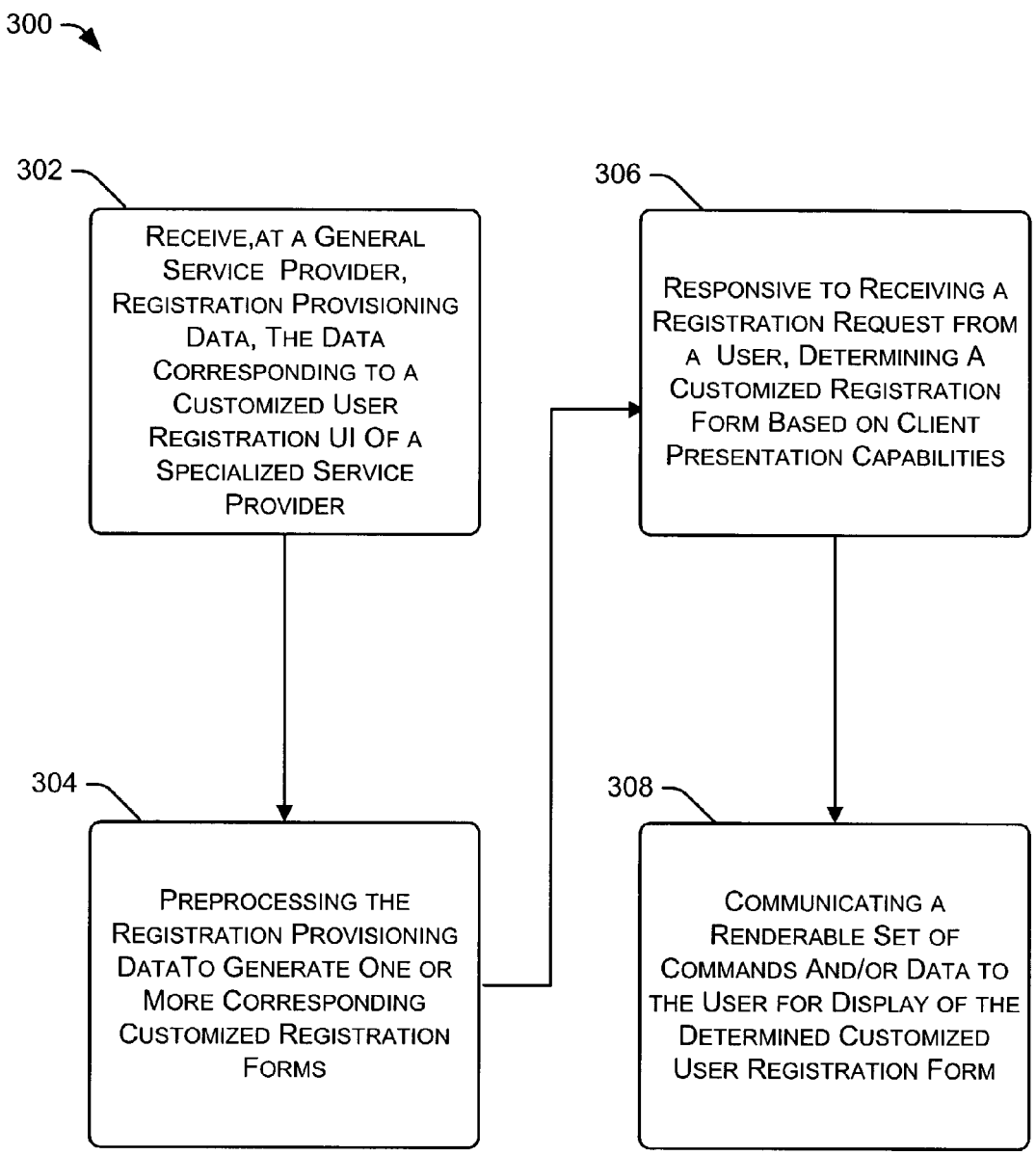
FIG. 3 shows an exemplary procedure for a first party to present a custom user registration form to second party on behalf of a third party.

FIG. 3 shows an exemplary procedure 300 for a first party 102 to present a custom user registration form 110 to second party 106 on behalf of a third party 104. At block 302, the procedure 300, or more specifically, the CRGM module 210 of FIG. 2, receives, at a general service provider 102, registration provisioning data 114. The data 114 corresponds to a customer user registration user interface of a specialized service provider 104.

At block 304, the CRGM module 210 preprocesses the received registration provisioning data 114 to generate information that is used to render one or more customized registration forms 110 to a requesting client 106. At block 306, the CRGM module 210, responsive to receiving a registration request from a user 106 to access specialized service from the service provider 104, determines a customized registration form 110 (generated at block 306) based on client 106 presentation capabilities. At block 308, the CRGM module 210 communicates as set of renderable commands and/or data corresponding to the generated customized registration form 110 (block 304) to the requesting client 106.

In this manner, the generalized service provider 102 of FIG. 1 renders the various aspects of the customized registration form 110 for presentation to the user of the client computing device 106. This procedure 300 for presenting customized registration on behalf of a specialized service provider 104, allows the user of the client 106 to receive the specialized services of the provider 104. This procedure 300 also allows a specialized service provider to have substantial control over the arrangement, formatting, or content of the registration page 110 UI elements that are used to collect consumer specific data.

Computer-Readable Media

Exemplary subject matter to present customized consumer registration information 110 to a user 106 on behalf of a third party service provider 106 may be stored on or transmitted across some form of computer-readable media. Computer-readable media can be any available media that can be accessed by a computer. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media.

The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

CONCLUSION

The described arrangements and procedures provide for presenting customized consumer registration information 110 to a user 106 on behalf of a third party service provider 104. Although the arrangements and systems to present customized consumer registration information 110 to a user 106 on behalf of a third party service provider 104 have been described in language specific to structural features and methodological operations, it is to be understood that the arrangements and procedures as defined the appended claims are not necessarily limited to the specific features or operations described. Rather, the specific features and operations are disclosed as preferred forms of implementing the claimed subject matter.

The invention claimed is:

1. A method for a first party to present a registration form to a second party on behalf of a third party, the method comprising:
   receiving, by the first party, registration provisioning data transmitted from the third party as an extensible markup language (XML) file, wherein the registration provisioning data are instructions and data specified by the third party to control the arrangement and content of multiple selectable styles of a custom registration form, wherein one of the multiple selectable styles of the custom registration form is provided by the first party to the second party to enable the second party to register for a specialized service provided by the third party;
   generating the custom registration form based at least in part on the registration provisioning data;
   receiving a request from the second party to register a specialized service provided by the third party; and
   responsive to receiving the request, communicating, by the first party, the custom registration form to the second party, wherein a style of the custom registration form is selected from the multiple selectable styles, based at least in part on characteristics of the second party as indicated by a data element transmitted as part of a redirect of the second party by the third party to the first party.

2. A method as recited in claim 1, wherein the registration provisioning data comprises style data, section data, and building block data, the style data comprising custom registration form device presentation and/or versioning information, the building block data comprising elements and/or behaviors corresponding to the section data.

3. A method as recited in claim 1, further comprising, before communicating the custom registration form, preprocessing the registration provisioning data to generate a renderable set of commands and/or data, the custom registration form being comprised of the renderable set of commands and/or data.

4. A method as recited in claim 1, wherein the characteristics of the second party comprise presentation characteristics of a client device used by the second party, the method further comprising, before communicating the custom registration form, preprocessing the registration provisioning data to generate a renderable set of commands and/or data that is substantially optimized to the presentation characteristics, the custom registration form being comprised of the renderable set of commands and/or data.

5. A method as recited in claim 1, wherein the first party receives the request based on a custom service provided by the first party to the third party.

6. A method as recited in claim 5, wherein the custom service is an authentication service.

7. A method as recited in claim 5, wherein the custom service is a plurality of services comprising a first service provided to the second party and a second service provided to the third party.

8. A computer-readable storage medium comprising computer executable instructions, that, when executed, enable a general provider to provide registration services to a special service provider, by:
   receiving registration provisioning data transmitted from the special service provider as an extensible markup language XML file, wherein the registration provisioning data includes instructions and data specifying aspects of a customized registration user interface (UI);
   receiving a message from a user, the message requesting access to a first service of the special service provider;
   responsive to receiving the message, communicating, by the general provider, a renderable set of commands and/or data to the user device for display of a registration form corresponding at least in part to the customized registration UI, wherein a style of the registration form is selected from a plurality of styles based at least in part on characteristics of the user as indicated by a data element transmitted as part of a redirect of the user by the special service provider to the general provider, the data element being associated with the message; and
   wherein the message is received by the general provider due to a second service provided by the general provider to the special service provider, the second service being used by the special service provider to register one or more users for access to the first service.

9. A computer-readable storage medium as recited in claim 8, wherein the general provider provides a plurality of services, wherein at least one of the plurality of services is provided to the user device and at least one other of the plurality of services is provided to the special service provider.

10. A computer-readable storage medium as recited in claim 8, wherein the registration provisioning data comprises style data, section data, and building block data.

11. A computer-readable storage medium as recited in claim 8, further comprising executable instructions that, when executed, direct the general provider to preprocess the registration provisioning data to generate the renderable set of commands and/or data.

12. A computer-readable storage medium as recited in claim 11, wherein the renderable set of commands are substantially optimized to presentation characteristics of a client device for presentation of the registration form.

13. A method to provide a core registration service to a special service provider, the method comprising:
 providing, by a general provider, the special service provider with substantial control to specify via instructions and data transmitted in an extensible markup (XML) file to the general provider elements of a registration form based on a pre-defined layout of the general provider and standard building blocks of the general provider, the XML file containing a plurality of user interface elements including:
 a first selectable style element for a first entity based on one or more of a first group comprising:
  a first type of customer;
  a first entity device; and
  a first entity operating platform;
 a second selectable style element, different from the first selectable style element, for a second entity based on one or more of a second group comprising:
  a second type of customer;
  a second entity device; and
  a second entity operating platform;
 validating, by the general provider, the XML file contents and data relationships based at least in part on a registration from schema;
 based on the validated XML file, generating a renderable version of the registration form comprising renderable commands and/or data;
 receiving, by the general provider, a registration request from an entity, the registration request corresponding to an attempt by the entity to access a protected resource or service of the special service provider;
 if the entity has not been previously authenticated, receiving, by the general provider, via a redirect of the entity from the special service provider to the general provider, a data element provided by the special service provider, the data element indicating the registration request;
 based on one or more of a third group comprising:
  a type of customer of the entity;
  a device of the entity; and
  an operating platform of the entity,
 selecting one of the first or second selectable style elements;
 communicating, by the general provider, a selected renderable version of the registration form to the entity, the renderable version selected based on the selected one of the first or second style elements;
 receiving, at the general provider, a completed registration form from the entity, the completed registration form containing entity authentication information;
 based on the entity authentication information, authenticating the entity for access to the protected resource or service of the special service provider; and
 providing by the general provider to the entity an authentication data element indicating authentication of the entity and redirecting the entity to the special service provider.

14. A method as recited in claim 13, further comprising:
 communicating at least a portion of the entity authentication information to the special service provider for evaluation as to whether to give the entity access to the protected resource or service.

15. A method as recited in claim 13, wherein the XML file contains information corresponding to at least one of registration form: (a) presentation; (b) versioning; (c) UI element positioning; or (e) UI element behavior.

16. A method as recited in claim 13, wherein generating the selected renderable version of the registration form includes generating the renderable set of commands and/or data that are substantially optimized to presentation characteristics of a device used by the entity to present the registration form.

17. A computing device to provide a core registration service to a special service provider, the computing device comprising:
 means for providing, by general provider, a special service provider with substantial control to specify via instructions and data transmitted in an extensible markup (XML) file to the general provider elements of multiple selectable styles of a registration form, the registration form being used by one or more entities to register for a service provided by the special service provider;
 means for receiving, by the general provider, a registration request from an entity, the registration request corresponding to an attempt by the entity to access the service provided by the special service provider; and
 responsive to receiving the registration request, means for communicating the registration form to the entity, wherein a style of the registration form is based on characteristics of the entity as indicated by a data element transmitted as part of a redirect of the entity by the special service provider to the general provider.

18. A computing device as recited in claim 17, wherein the general provider is an authentication service.

19. A computing device as recited in claim 17, further comprising:
 means for receiving information from the user corresponding to the registration form; and
 means for communicating the information to the special service provider for evaluation as to whether to give the entity access to the service provided by the special service provider.

20. A computing device as recited in claim 17, wherein the means for providing the special service provider with substantial control comprises means for receiving, by the general provider, registration provisioning data including the instructions from the special service provider, the registration form being based at least in part on the registration provisioning data.

21. A computing device as recited in claim 20, further comprising means for preprocessing the registration provisioning data to generate a renderable set of commands and/or data, the registration form being comprised of the renderable set of commands and/or data.

22. A computing device as recited in claim 20, further comprising:
   means for determining presentation characteristics of a display device; and
   means for preprocessing the registration provisioning data to generate a renderable set of commands and/or data that is substantially optimized to the presentation characteristics, the registration form being comprised of the renderable set of commands and/or data.

23. A method as recited in claim 1, wherein the selection of the style of the custom registration form is performed by the first party, and wherein the data element that is transmitted, as part of the redirect of the second party by the third party to the first party, indicates the selected style.

24. A method as recited in claim 1, wherein the selection of the style of the custom registration form is performed by the first party.

* * * * *

UNITED STATES PATENT AND TRADEMARK OFFICE
CERTIFICATE OF CORRECTION

PATENT NO. : 7,356,560 B2
APPLICATION NO. : 10/157100
DATED : April 8, 2008
INVENTOR(S) : Iulian D. Calinov et al.

It is certified that error appears in the above-identified patent and that said Letters Patent is hereby corrected as shown below:

In column 10, line 3, in Claim 1, after "register" insert --for--.

In column 11, line 44, in Claim 13, delete "from" and insert --form--, therefor.

In column 12, line 29, in Claim 17, before "general" insert --a--.

Signed and Sealed this
Twenty-second Day of February, 2011

David J. Kappos
*Director of the United States Patent and Trademark Office*